United States Patent
Matsuo et al.

(10) Patent No.: US 7,505,657 B2
(45) Date of Patent: Mar. 17, 2009

(54) SINGLE-MODE OPTICAL FIBER (75) Inventors: Shoichiro Matsuo, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/951,005

(22) Filed: Dec. 5, 2007

(65) Prior Publication Data
US 2008/0101755 A1 May 1, 2008

Related U.S. Application Data (60) Division of application No. 11/673,471, filed on Feb. 9, 2007, now Pat. No. 7,366,387, which is a continuation of application No. PCT/JP2005/014560, filed on Aug. 9, 2005.

(30) Foreign Application Priority Data

| | | |
|---|---|---|
| Aug. 10, 2004 | (JP) | ............................. 2004-233111 |
| Apr. 19, 2005 | (JP) | ............................. 2005-120996 |

(51) Int. Cl.
*G02B 6/02* (2006.01)
(52) U.S. Cl. .................................... 385/123
(58) Field of Classification Search .................. 385/123
See application file for complete search history.

(56) References Cited

U.S. PATENT DOCUMENTS

| 7,412,128 B2 * | 8/2008 | Guan et al. .................... 385/28 |
| 2004/0213531 A1 | 10/2004 | Sasaoka |
| 2007/0201791 A1 | 8/2007 | Guan et al. |

FOREIGN PATENT DOCUMENTS
WO WO 01/27667 A2 4/2001

OTHER PUBLICATIONS

Itaru Sakabe et al., "Enhanced Bending Loss Insensitive Fiber and New Cables for CWDM Access Networks" Proceedings of the 53rd IWCS, pp. 112-118 (2004).

Shoichiro Matsuo et al., "Bend-Insensitive and Low-Splice-Loss Optical Fiber for Indoor Wiring in FTTH" OFC 2004, THI3.

Fumiaki Satou et al., "Small Allowable Bending Radius Type Optical Fiber for Access Networks" The Institute of Electronics, Information and Communication Engineers (IEICE) Society Conference 2003, B-10-30.

(Continued)

*Primary Examiner*—Frank G Font
*Assistant Examiner*—Erin D Chiem
(74) *Attorney, Agent, or Firm*—Sughrue Mion, PLLC (57) ABSTRACT

A single-mode optical fiber has a prescribed mode field diameter ($MFD_1$ (μm)) at a first wavelength $\lambda_1$, in which a bending loss when measured at a second wavelength $\lambda_2$ (μm) and wound with a bending radius r (mm) is $L_b$ (dB) for one bending, a connector/splice loss with an optical fiber that has a prescribed mode field diameter $MFD_2$ (μm) at the first wavelength $\lambda_1$ is $L_s$ (dB) for one connection/splice point at the second wavelength $\lambda_2$ (μm), and an mode field diameter dependence of a total loss coefficient calculated by a formula (1) has a local minimal value in a range of $MFD_1 \pm 0.5$ μm, with the formula (1) being as follows:

$$L = w_s \cdot L_s + w_b \cdot L_b, \qquad (1)$$

$$w_s + w_b = 1, \qquad (2)$$

$$w_s > 0, w_b > 0, \qquad (3)$$

where $w_s$ and $w_b$ in the formula (1) represent dimensionless weighting factors and are set within a range that satisfies the formulas (2) and (3).

19 Claims, 9 Drawing Sheets

OTHER PUBLICATIONS

Masataka Ikeda et al., "Low Bending Loss Optical Fiber with Reduced Splice Loss" Technical Report of IEICE, OCS 2003-43.

Jian Zhou et al., "Application of PCF to Optical Fiber Wiring in Residential and Business Premises" Technical Report of IEICE, OFT 2002-81.

Bing Yao et al., "A Study of Utilization of Holey Fibers" Technical Report of IEICE, OFT 2002-82.

Masataka Ikeda et al., "Setsuzoku Sonshitsu O Teigen Shita Teimage Sonshitsu Hikari Fiber", Fujikura Giho, Oct. 31, 2003 No. 105, pp. 6 to 10.

Masataka Ikeda et al., "Setsuzoku Sonshitsu Teigengata Teimage Sonshitsu Hikari Fiber", The Institute of Electronics, Information and Communication Engineers Gijutsu Kenkyu Hokoku, Aug. 21, 2003, vol. 103, No. 257 (OFT 2003 19-36), pp. 35-40.

Masataka Ikeda et al., "Setsuzoku Sonshitsu Teigengata Teimage Sonshitsu Hikari Fiber", Proceedings of the IEICE Conference, Mar. 8, 2004, Tsushin 2, p. 372 (B-10-1).

* cited by examiner

SINGLE-MODE OPTICAL FIBER

This is a Divisional of U.S. Ser. No. 11/673,471 filed Feb. 9, 2007, which is a Continuation Application of International Application No. PCT/JP2005/014560, filed Aug. 9, 2005, which claims priority to Japanese Patent Application No. 2004-233111, filed on Aug. 10, 2004 and Japanese Patent Application No. 2005-120996 filed Apr. 19, 2005, the contents of which are entirely incorporated herein by reference.

TECHNICAL FIELD

The present invention relates to a single-mode optical fiber (hereinafter, referred to as an SMF) that is excellent in bending characteristics and connector/splice characteristics, and can be preferably used as an optical fiber for which low bending loss is especially required, such as in optical access or small component uses.

BACKGROUND ART

Conventionally, developments of a transmission system and an optical fiber that use Wavelength Division Multiplexing (WDM) have been actively advanced with the objective of increasing the data transmission rate in backbone and/or long-distance systems. The characteristics such as suppression of the nonlinear effect or chromatic dispersion control have been demanded for optical fibers for WDM transmission. In recent years, optical fibers in which the dispersion slope is decreased for a system called metro (metropolitan area network) with a span of about several kilometers or optical fibers that are subjected to virtually no loss increase due to Hydroxyl Group (OH) have been proposed.

When introduction of optical fibers to offices and homes (Fiber To The Home; FTTH) is taken into consideration, characteristics different from those for the above-described optical fibers for transmission are required. In the case of wiring the fibers in the building or the house, there is the possibility that a very small bending with a diameter such as 30 mm or 20 mm occurs. Furthermore, when the extra length of the cable is stored, it is very important that a loss increase does not occur even if the cable is wound around a small radius. That is, it is a very important characteristic for the optical cable for FTTH to resist a small-radius bend. The connectivity with optical fibers (many of which are SMFs with a normal bandwidth of 1.3 µm) used from the base station to the building or to the house is also an important point.

Patent Document 1: U.S. Patent Application Publication No. 2004/0213531

Patent Document 2: PCT International Publication No. WO 01/27667 pamphlet

Non-Patent Document 1: I. Sakabe, et al., "Enhanced Bending Loss Insensitive Fiber and New Cables for CWDM Access Network," Proceedings of the 53rd IWCS, pp. 112-118 (2004)

Non-Patent Document 2: S. Matsuo et al., "Bend-insensitive and low-splice-loss optical fiber for indoor wiring in FTTH," OFC 2004, ThI3

Non-Patent Document 3: Sato et al., "Optical Fiber Conforming to Bending around Small Radius for Optical Access," The Institute of Electronics, Information and Communication Engineers (IEICE) Society Conference 2003, B-10-30

Non-Patent Document 4: Ikeda et al., "Low Bending Loss Optical Fiber with Reduced Splice Loss," Technical Report of IEICE, OCS 2003-43

Non-Patent Document 5: Zhou et al., "A Study on Application of Photonic Crystal Fiber to Wiring in Homes and Buildings," Technical Report of IEICE, OFT 2002-81

Non-Patent Document 6: Yao et al., "A Study on Commercialization of Holey Fiber," Technical Report of IEICE, OFT2002-82

DISCLOSURE OF INVENTION

Problem to be Solved by the Invention

Conventionally, in offices and homes, normal SMFs with a bandwidth of 1.3 µm or multimode optical fibers are generally used. However, these conventional optical fibers have generally allowed bending diameters down to about 60 mm. In the wiring of the fibers, close attention has been required to eliminate extra bending.

Furthermore, recently, SMFs have been commercialized that permit allowable bending diameters down to 30 mm by reducing the mode field diameter (hereafter, referred to as MFD) within a range complying with ITU-T G.652, the international standard for the SMF for 1.3 µm bandwidth. However, SMFs that conform to bendings around a smaller radius are desirable for wiring in buildings and homes.

However, an SMF with enhanced bending characteristics generally has a problem in that it has a small MFD, thus worsening the connector/splice characteristics.

That is, a parameter that works as an index to determine the optimal optical fiber in an environment that assumes a small-radius bend has not been known.

The present invention has been achieved in view of such circumstances, and has an object to provide an SMF whose loss characteristics become optimal in a line assumed to be bent in small radius.

Means for Solving the Problem

To achieve the above-mentioned object, the present invention provides an SMF, having a prescribed MFD ($MFD_1$ (µm)) at a first wavelength $\lambda_1$, in which a bending loss when measured at a second wavelength $\lambda_2$ (µm) and wound with a bending radius r (mm) is $L_b$ (dB) for one bending (turn), a connector/splice loss with an optical fiber that has a prescribed MFD ($MFD_2$ (µm)) at the first wavelength $\lambda_1$ is $L_s$ (dB) for one connection/splice point at the second wavelength $\lambda_2$ (µm), and an MFD dependence L of a total loss coefficient calculated by a formula (1) has a local minimal value in a range of $MFD_1 \pm 0.5$ µm, with the formula (1) being as follows:

$$L = w_s \cdot L_s + w_b \cdot L_b, \quad (1)$$

$$w_s + w_b = 1, \quad (2)$$

$$w_s > 0, w_b > 0, \quad (3)$$

where $w_s$ and $w_b$ in the formula (1) represent dimensionless weighting factors and are set within a range that satisfies the formulas (2) and (3).

Furthermore, the present invention provides an SMF, having a prescribed MFD ($MFD_1$ (µm)) at a first wavelength $\lambda_1$, in which a bending loss when measured at a second wavelength $\lambda_2$ (µm) and wound with a bending radius r (mm) is $L_b$ (dB) for one bending, the number of bendings is $t_b$, a connector/splice loss with an optical fiber that has a prescribed MFD ($MFD_2$ (µm)) at the first wavelength $\lambda_1$ is $L_s$ (dB) for one connection/splice point at the second wavelength $\lambda_2$ (µm), the number of connector/splice points is $n_s$, and an MFD dependence of a total loss coefficient L calculated by a formula (4)

has a local minimal value in a range of $MFD_1 \pm 0.5$ µm, with the formula (4) being as follows:

$$L = n_s \cdot L_s + t_b \cdot L_b \quad (4)$$

where $n_s > 0$, $t_b > 0$.

In the SMF of the present invention, it is preferable that the connector/splice loss $L_s$ be 0.5 dB or less.

In the SMF of the present invention, it is preferable that an amount of variation in total loss coefficient L when the $MFD_1$ is changed by ±0.3 µm be 0.4 dB or less. It is further preferable that the amount of variation be 0.2 dB or less.

In the SMF of the present invention, it is preferable that the bending radius r be less than 15 mm.

In the SMF of the present invention, it is preferable that the bending loss $L_b$ be 0.05 dB or less with the bending radius r=10 mm and the second wavelength $\lambda_2$=1550 nm.

In the SMF of the present invention, it is preferable that the bending loss $L_b$ be 0.05 dB or less with the bending radius r=7.5 mm and the second wavelength $\lambda_2$=1550 nm.

It is preferable that the SMF of the present invention include: a central core that has a radius $r_1$ and a refractive index $n_1$; and a cladding with a substantially constant refractive index $n_c$ that surrounds the central core, where $n_1 > n_c$.

It is preferable that the SMF of the present invention include: a central core that has a radius $r_1$ and a refractive index $n_1$; an inner cladding that is provided around the outer circumference of the central core and has a radius $r_2$ and a refractive index $n_2$; a trench that is provided around the outer circumference of the inner cladding and has a radius $r_3$ and a refractive index $n_3$; and an outer cladding that is provided around the outer circumference of the trench and has a radius $r_c$ and a refractive index $n_c$, where $n_1 > n_c > n_3$, $n_1 > n_2 > n_3$.

In the SMF of the present invention, it is preferable that the first wavelength $\lambda_1$=1310 nm and that the $MFD_2$ be in the range that satisfies the specifications under the international standard ITU-T G.652.

In the SMF of the present invention, it is preferable that the connector/splice loss be a splice loss measured with each of the optical fibers mechanically spliced.

In the SMF of the present invention, it is preferable that the connector/splice loss be a splice loss measured with each of the optical fibers fusion-spliced.

In the SMF of the present invention, it is preferable that the connector/splice loss be a connection loss measured with each of the optical fibers connected with a connector.

In the SMF of the present invention, it is preferable that the diameter of the cladding be within 125 µm±1 µm.

In the SMF of the present invention, it is preferable that the center value for the diameter of the cladding be in a range of 60 µm to 100 µm.

Furthermore, the present invention provides an SMF, having a prescribed MFD ($MFD_1$ (µm)) at a first wavelength $\lambda_1$, in which a bending loss when measured at a second wavelength $\lambda_2$ (µm) and wound with a bending radius r (mm) is $L_b$ (dB) for one bending, a connector/splice loss with an optical fiber that has a prescribed MFD ($MFD_{2i}$ (µm)) at the first wavelength $\lambda_1$, is $L_{si}$ (dB) for one connection/splice point at the second wavelength $\lambda_2$ (µm), and an MFD dependence of a total loss coefficient L calculated by a formula (A) has a local minimal value in a range of $MFD_1 \pm 0.5$ µm, the formula (A) being as follows:

$$L = \sum_{i}^{n} w_{si} \cdot L_{si} + w_b \cdot L_b \quad (A)$$

$$\sum_{i=1}^{n} w_{si} + w_b = 1$$

$$w_{si} > 0, w_b > 0$$

where n represents the number of optical fibers that are connected with the SMF of the present invention, $w_{si}$ represents a dimensionless weighting coefficient, and $L_{si}$ represents a connector/splice loss (dB) between the SMF of the present invention and the i-th optical fiber.

Furthermore, the present invention provides an SMF, having a prescribed MFD ($MFD_1$ (µm)) at a first wavelength $\lambda_1$, in which a bending loss when measured at a second wavelength $\lambda_2$ (µm) and wound with a bending radius r (mm) is $L_b$ (dB) for one bending, the number of bendings is $t_b$, a connector/splice loss with an optical fiber that has a prescribed MFD ($MFD_{2i}$ (µm)) at the first wavelength $\lambda_1$ is $L_{si}$ (dB) for one connection/splice point at the second wavelength $\lambda_2$ (µm), the number of connection/splice points is $n_{si}$ and an MFD dependence of a total loss coefficient L calculated by a formula (B) has a local minimal value in a range of $MFD_1 \pm 0.5$ µm, the formula (B) being as follows:

$$L = \sum_{i=1}^{n} n_{si} \cdot L_{si} + t_b \cdot L_b \quad (B)$$

where n represents the number of optical fibers that are connected with the SMF of the present invention, $n_{si}$ represents the connection times between the SMF of the present invention and the i-th optical fiber, and $L_{si}$ represents a connector/splice loss (dB) between the SMF of the present invention and the i-th optical fiber.

In the SMF of the present invention, it is preferable that the connector/splice loss $L_{si}$ be 0.1 dB or less.

In the SMF of the present invention, it is preferable that a variation in total loss coefficient L when the $MFD_1$ is changed by ±0.3 µm be 0.4 dB or less.

In the SMF of the present invention, it is preferable that a variation in total loss coefficient L when the $MFD_1$ is changed by ±0.3 µm be 0.2 dB or less.

Effects of the Invention

The SMF of the present invention can realize a stable optical transmission that has a small variation in loss with respect to a state change under a condition of use that demands consideration of loss occurrence resulting from a small-radius bend and a connection with a normal SMF.

The SMF of the present invention is configured such that loss characteristics become optimal in a line assumed to be bent around a small radius. Therefore, it can be preferably used as an SMF for which low loss in bending around a small radius is especially required, such as in optical access or small component uses.

DESCRIPTION OF SYMBOLS

1: core; 2: cladding; 3: inner cladding; 4: trench; 5: outer cladding; 6: inner cladding; 7, 8: outer core; 9: first trench; 10: low refractive index region; 11: electric pole; 12: closure; 13: branch cable; 14: drop cable; 15: ONU; 16: cabinet; 17: indoor cable; 18: wall; 19: cord with connectors; 20: optical connector; 100, 200, 300A, 300B, 300C, 300D, 300E, 300F: SMF

BEST MODE FOR CARRYING OUT THE INVENTION

Hereunder is a description of embodiments of the SMF of the present invention.

A first embodiment of the SMF of the present invention is characterized by having a prescribed MFD ($MFD_1$ (μm)) at a first wavelength $\lambda_1$, in which a bending loss when measured at a second wavelength $\lambda_2$ (μm) and wound with a bending radius r (mm) is $L_b$ (dB) for one bending, a connector/splice loss with an optical fiber that has a prescribed MFD ($MFD_2$ (μm)) at the first wavelength $\lambda_1$ is $L_s$ (dB) for one connection/splice point at the second wavelength $\lambda_2$ (μm), and an MFD dependence of a total loss coefficient L calculated by a formula (1) has a local minimal value in a range of $MFD_1 \pm 0.5$ μm, with the formula (1) being as follows:

$$L = w_s \cdot L_s + w_b \cdot L_b, \quad (1)$$

where $w_s$ and $w_b$ represent dimensionless weighting factors and are set within a range that satisfies the following formulas (2) and (3):

$$w_s + w_b = 1, \quad (2)$$

$$w_s > 0, w_b > 0, \quad (3)$$

A second embodiment of the SMF of the present invention is characterized by having a prescribed MFD ($MFD_1$ (μm)) at a first wavelength $\lambda_1$, in which a bending loss when measured at a second wavelength $\lambda_2$ (μm) and wound with a bending radius r (mm) is $L_b$ (dB) for one bending, the number of bendings is $t_b$, a connector/splice loss with an optical fiber that has a prescribed MFD ($MFD_2$ (μm)) at the first wavelength $\lambda_1$ is $L_s$ (dB) for one connection/splice point at the second wavelength $\lambda_2$ (μm), the number of connector/splice points is $n_s$, and an MFD dependence of a total loss coefficient L calculated by a formula (4) has a local minimal value in a range of $MFD_1 \pm 0.5$ μm, with the formula (4) being as follows;

$$L = n_s \cdot L_s + t_b \cdot L_b \quad (4)$$

where $n_s > 0$, $t_b > 0$.

The SMF of the present invention, which is designed by the use of a total loss coefficient L calculated from the formula (1) or the formula (4), can realize a stable optical transmission that has a small variation in loss with respect to a state change under a condition of use that demands consideration of loss occurrence resulting from a small-radius bending and a connection with a normal SMF.

In the first and second embodiments, there may be cases in which an $MFD_2$ of an optical fiber that is connected with the SMF of the present invention may have a plurality of values. For example, in a normal process of an optical fiber manufacturing, an MFD can be evaluated in a condition that a median value in manufacture (an average value of MFDs of optical fibers manufactured) is regarded as an $MFD_2$ (μm). Furthermore, there may be cases in which the SMF of the present invention is connected with an optical fiber that has an MFD with a different median value in manufacture. For example, when the SMF of the present invention is applied to a drop cable 14 in FIG. 3A, the following two cases can be conceived. One is a case in which an MFD with the same MFD is used for both a branch cable 13 and an optical network unit (ONU), which corresponds to the first and second embodiments. The other is a case in which an SMF with enhanced bend-resistance having an MFD smaller than that for a normal SMF as described above is used in a connection portion of the ONU. While the median value in manufacture of the MFD for a normal SMF is about 9.2 μm at 1310 nm, the median value in manufacture of the MFD for an SMF with enhanced bend-resistance is about 8.6 μm. In such a case, it is possible to handle the decrease in MFD by modifying the formula (1) and the formula (4) as below.

The formula (1) can be modified as the following formula (A):

$$L = \sum_{i}^{n} w_{si} \cdot L_{si} + w_b \cdot L_b \quad (A)$$

-continued $$\sum_{i=1}^{n} w_{si} + w_b = 1$$

$$w_{si} > 0, w_b > 0$$

where n represents the number of optical fibers that are connected with the SMF of the present invention, $w_{si}$ represents a dimensionless weighting coefficient, and $L_{si}$ represents a connector/splice loss (dB) between the SMF of the present invention and the i-th optical fiber.

The formula (4) can be modified as the following formula (B):

$$L = \sum_{i=1}^{n} n_{si} \cdot L_{si} + t_b \cdot L_b \quad (B)$$

where n represents the number of optical fibers that are connected with the SMF of the present invention, $n_{si}$ represents the connection times between the SMF of the present invention and the i-th optical fiber, and $L_{si}$ represents a connector/splice loss (dB) between the SMF of the present invention and the i-th optical fiber.

The above-mentioned first wavelength $\lambda_1$ and second first wavelength $\lambda_2$ can be selected from an optical transmission wavelength region using the SMF. For example, they can be selected from a range of 1260 nm to 1650 nm. The wavelength range of 1260 nm to 1625 nm is used for an SMF transmission. The wavelength range of 1625 nm to 1650 nm is used for monitoring the lines.

The above-mentioned bending radius r can be a radius bent around a small radius assumed in real use of the SMF of the present invention. It is preferable that the bending radius r be less than 15 mm.

In the SMF of the present invention, it is preferable that a bending loss $L_b$ for one bending measured with a bending radius r=7.5 mm or 10 mm and a second wavelength $\lambda_2$=1550 nm, which is an estimation wavelength for a bending loss, be 0.05 dB or less. The bending loss $L_b$ exceeding 0.05 dB is not preferable because a loss increases due to a plurality of small-radius bendings.

The above-mentioned connector/splice loss is measured in a condition that the SMF of the present invention is connected with an SMF used as an ordinary optical line (hereafter, referred to as a normal SMF) by means of a mechanical splice, a fusion splice, or a connector. In the SMF of the present invention, it is preferable that the connector/splice loss $L_s$ for one connection/splice point measured at the second wavelength $\lambda_2$ (µm) be 0.5 dB or less. The connection/splice loss $L_s$ exceeding 0.5 dB is not preferable because a loss increases when there are a plurality of connector/splice points. Note that a normal SMF to be connected with the SMF of the present invention is often an SMF for a 1.3 µm band under the international standard ITU-T G.652.

As for the SMF of the present invention, it is only required that various parameters such as a core diameter, an MFD, a relative index difference between the core and the cladding, and a refractive index profile in the radial direction are set such that an MFD dependence of a total loss coefficient L calculated by the formula (1) or (4) has a local minimal value in a range of $MFD_1 \pm 0.5$ µm. The material, shape of the refractive index profile and the like can be set appropriately.

As for the material for the SMF, silica glass or the like can be used, as is the case with the normal SMF. The SMF of the present invention can be manufactured by various conventional, known methods, as is the case with the manufacturing methods for the normal SMF.

Figure 1:
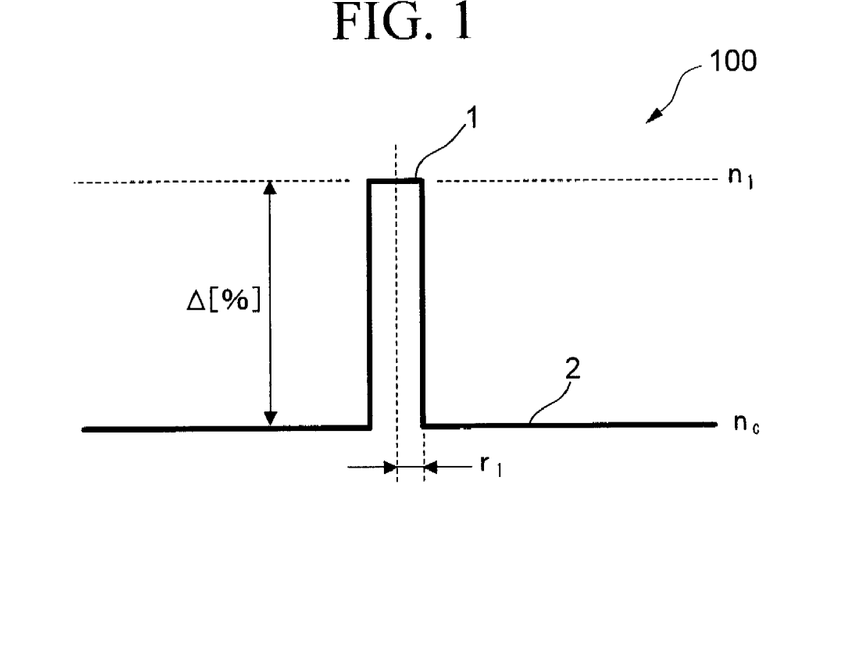
FIG. 1 is a graph showing a single-peak-type refractive index profile of the SMF of the present invention.

FIG. 1 is, as an example of the SMF of the present invention, a graph showing a single-peak-type (step-type) refractive index profile.

An SMF 100 of the present invention with this single-peak-type refractive index profile includes: a central core 1 that has a radius $r_1$ and a refractive index $n_1$; and a cladding 2 with a substantially constant refractive index $n_c$ that surrounds the central core 1, where $n_1 > n_c$. It is preferable that the diameter of the cladding 2 be within 125 µm±1 µm. Furthermore, the center value for the cladding diameter is not limited to 125 µm. For example, in an optical fiber that requires a very small bending radius such as r=5 mm, it is effective to make the cladding diameter small for decreasing the probability of fatigue failure. Therefore, the center value for the cladding diameter can be appropriately set in the range of 60 µm to 100 µm according to the conditions of use of the optical fiber.

Figure 10:
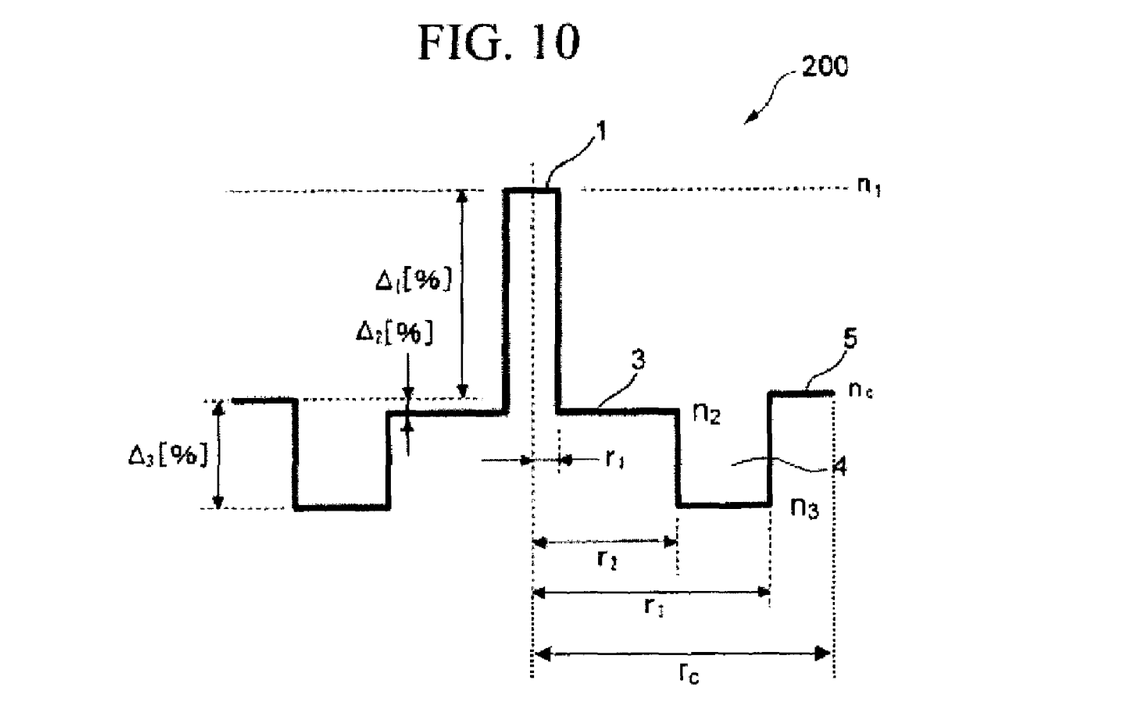
FIG. 10 is a graph showing a trench-type refractive index profile of the SMF of the present invention.

FIG. 10 is, as another example of the SMF of the present invention, a graph showing a trench-type refractive index profile.

An SMF 200 of the present invention with this trench-type refractive index profile includes: a central core 1 that has a radius $r_1$ and a refractive index $n_1$; an inner cladding 3 that is provided around the outer circumference of the central core 1 and has a radius $r_2$ and a refractive index $n_2$; a trench 4 that is provided around the outer circumference of the inner cladding 3 and has a radius $r_3$ and a refractive index $n_3$; and an outer cladding 5 that is provided around the outer circumference of the trench 4 and has a radius $r_c$ and a refractive index $n_c$, where $n_1 > n_c > n_3$, $n_1 > n_2 > n_3$. It is preferable that the diameter of the outer cladding 5 be within 125 µm±1 µm. The center value for the cladding diameter is not limited to 125 µm but can be appropriately set in the range of 60 µm to 100 µm.

Furthermore, the present invention is applicable to SMFs with various refractive index profiles shown in FIGS. 17A to 17F.

Figure 17A:
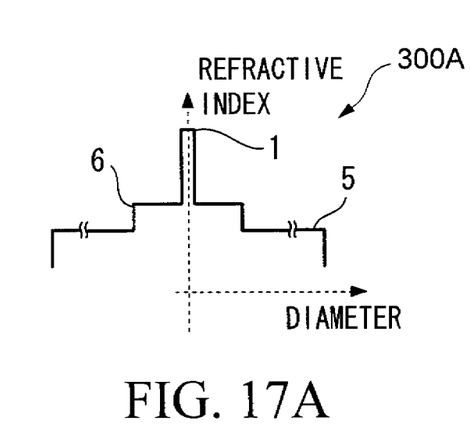
FIG. 17A is a graph exemplifying another refractive index profile of the SMF of the present invention.

An SMF 300A shown in FIG. 17A includes a single-peak-type central core 1 and a two-layered cladding, in which an inner cladding 6 has a higher refractive index than an outer cladding 5.

Figure 17B:
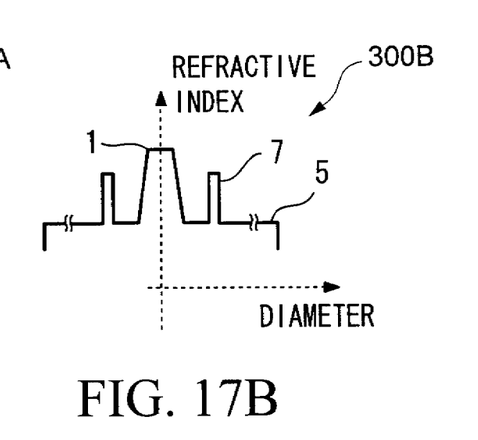
FIG. 17B is a graph exemplifying another refractive index profile of the SMF of the present invention.

An SMF 300B with the refractive index profile shown in FIG. 17B is provided with an outer cladding 5 outside a central core 1 with a trapezoidal refractive index profile, and includes an outer core 7 with a high refractive index spaced apart from the central core 1.

Figure 17C:
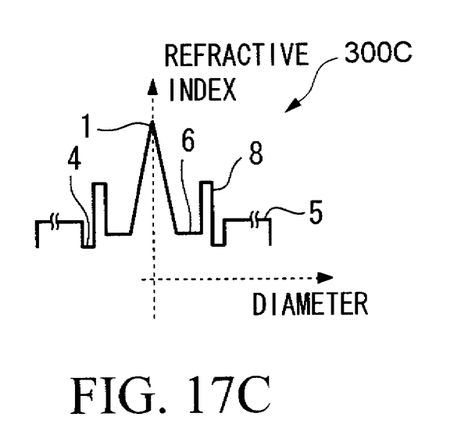
FIG. 17C is a graph exemplifying another refractive index profile of the SMF of the present invention.

An SMF 300C with the refractive index profile shown in FIG. 17C is configured such that outside a center core 1 with a triangular refractive index profile is provided with an inner cladding 6 with a low refractive index, an outer core 8 with a high refractive index, a trench 4 with the lowest refractive index, and an outer cladding 5 with a low refractive index, in this order.

Figure 17D:
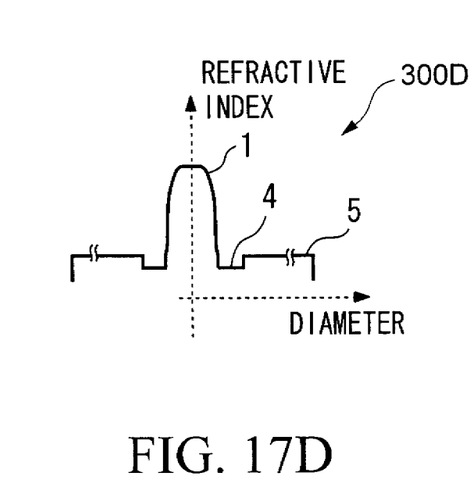
FIG. 17D is a graph exemplifying another refractive index profile of the SMF of the present invention.

An SMF 300D with the refractive index profile shown in FIG. 17D is configured such that outside a central core 1 with an inverted U-shaped refractive index profile is provided with a trench 4 with a low refractive index and an outer cladding 5 with a low refractive index, in this order.

Figure 17E:
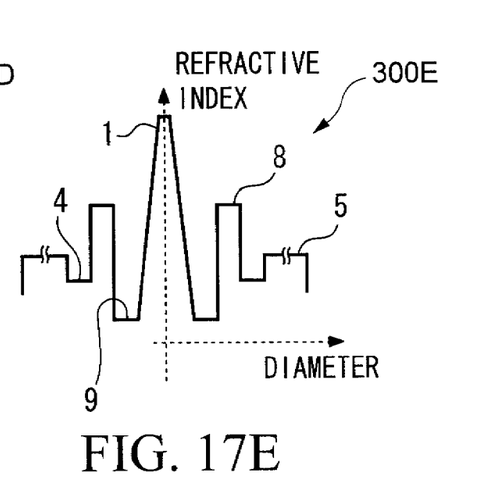
FIG. 17E is a graph exemplifying another refractive index profile of the SMF of the present invention.

An SMF 300E with the refractive index profile shown in FIG. 17E is configured such that outside a central core 1 with a trapezoidal or triangular refractive index profile is provided with a first trench 9 with the lowest refractive index, an outer core 8 with a high refractive index, a second trench 4 with a low refractive index, and an outer cladding 5 with a low refractive index, in this order.

Figure 17F:
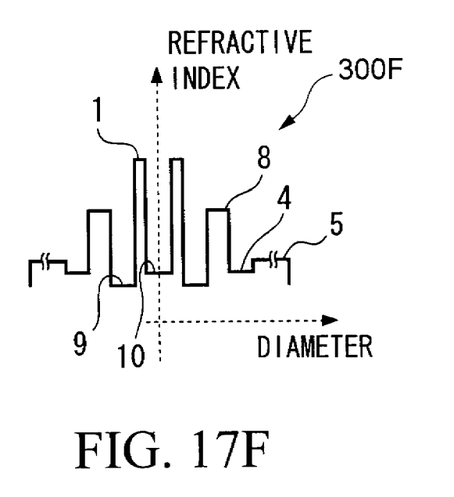
FIG. 17F is a graph exemplifying another refractive index profile of the SMF of the present invention.

An SMF 300F with the refractive index profile shown in FIG. 17F is configured in the same manner as in FIG. 17E, that is, it is configured such that outside a central core 1 is provided with a first trench 9 with the lowest refractive index, an outer core 8 with a high refractive index, a second trench 4 with a low refractive index, and an outer cladding 5 with a low refractive index, in this order, the exception being that the central core 1 is constituted by a low refractive index region 10 at its central portion with a high refractive index region thereoutside.

EXAMPLES

Example 1

This example is designed for optimal characteristics with the assumption that the refractive index profile called a single-peak type as shown in FIG. 1 is used to apply bendings down to a 10-mm radius to the SMF 100.

Figure 2:
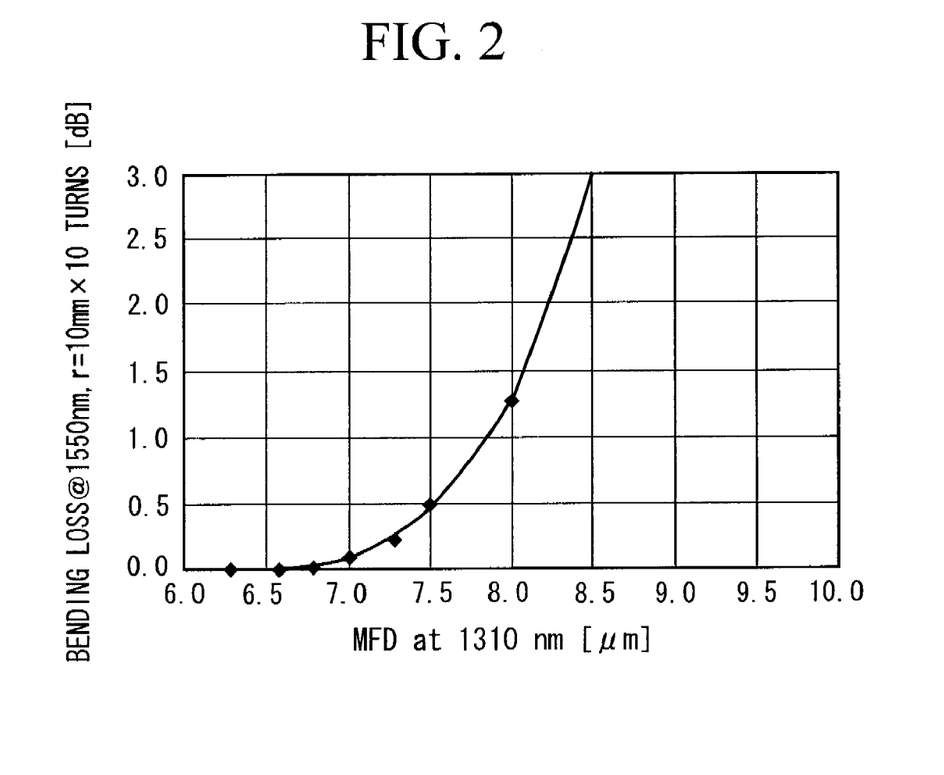
FIG. 2 is a graph of MFD dependence of bending loss (single-peak-type, r=10 mm), which shows a result of Example 1.

The relationship, according to the single-peak-type refractive index profile, between an MFD at a wavelength of 1310 nm when a cable cut-off wavelength is set to 1260 nm and a bending loss when 10 bendings are applied with a 10-mm radius at a wavelength of 1550 nm is shown in FIG. 2.

As shown in FIG. 2, the larger the MFD is, the smaller the bending loss is. This FIG. 2 leaves an impression that a design for making the MFD as small as possible is preferable for an SMF for use in a situation that demands resistance to bending.

Figure 3A:
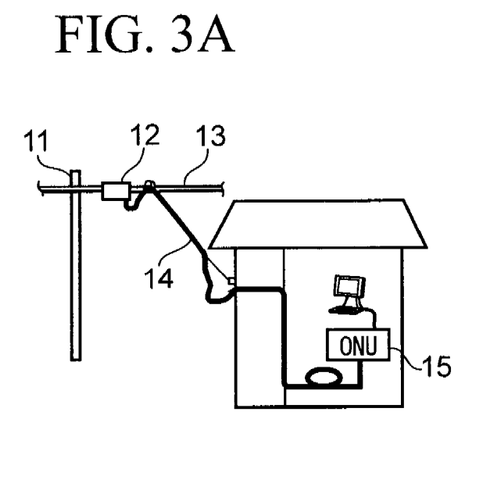
FIG. 3A is a schematic block diagram showing a connection configuration assumed for indoor wiring.
Figure 3B:
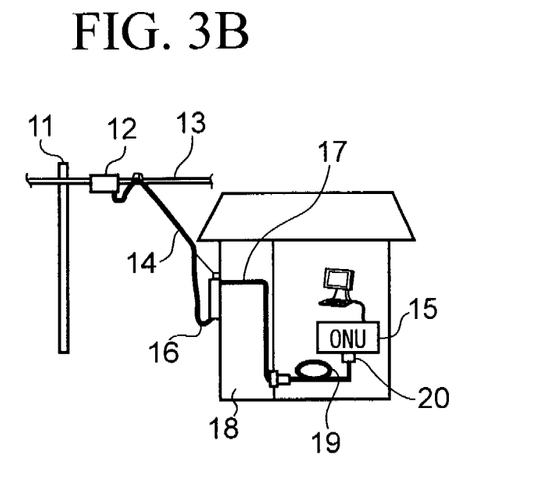
FIG. 3B is a schematic block diagram showing another connection configuration assumed for indoor wiring.

In the real use environment, however, a connector/splice loss needs to be taken into consideration in addition to a bending loss. FIGS. 3A and 3B are figures exemplifying a configuration assumed for indoor wiring, in which reference numeral 11 denotes an electric pole, reference numeral 12 a closure, reference numeral 13 a branch cable, reference numeral 14 a drop cable, reference numeral 15 an ONU (Optical Network Unit), reference numeral 16 a cabinet, reference numeral 17 an indoor cable, reference numeral 18 a wall, reference numeral 19 a cord with connectors, and reference numeral 20 an optical connector.

A normal SMF defined under ITU-T G.652 is widely used for a branch cable 13 and the like. Therefore, it is desirable that connection with this normal SMF be borne in mind for connection characteristics.

Figure 4:
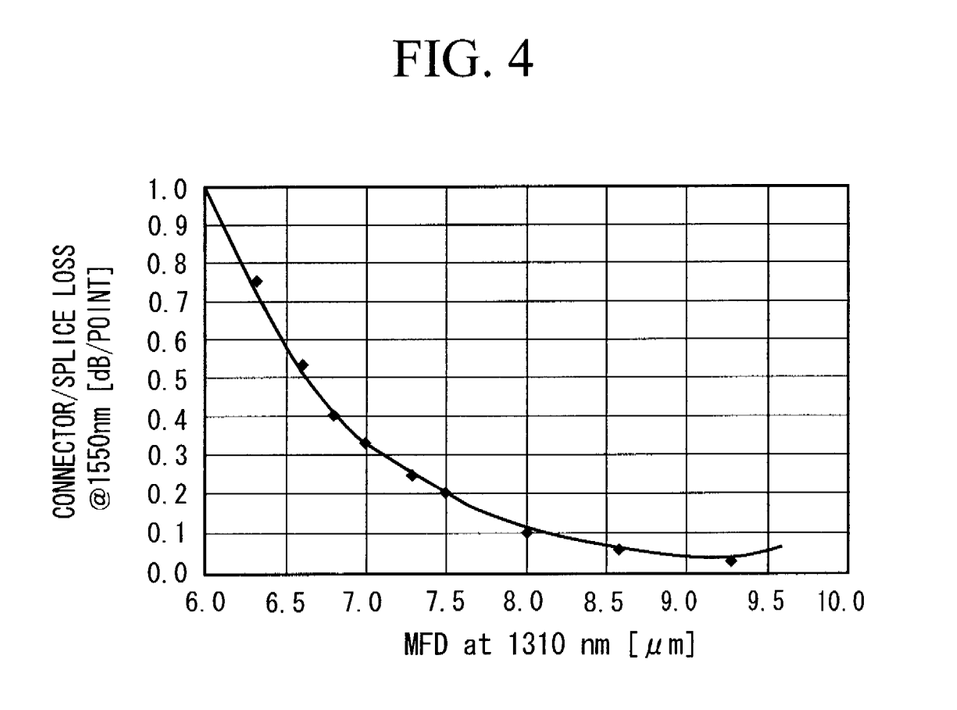
FIG. 4 is a graph of MFD dependence of connector/splice loss, which shows a result of Example 1.

FIG. 4 shows a result of the evaluation of the connector/splice loss between the SMF 100 of the single-peak type (FIG. 1) and a normal SMF (MFD at a wavelength of 1310 nm is 9.2 μm). A connector/splice loss between optical fibers can be evaluated, as is shown in D. Marcuse, "Loss analysis of single-mode fiber splices", Bell syst. Tech. J. vol. 56, no. 5, p. 703, May, 1977, from the coupling efficiency calculated from MFDs of two types of optical fibers by the use of the formula (5) as follows:

$$T_g = (2 \cdot w_1 \cdot w_2/(w_1^2 + w_2^2))^2 \cdot \exp(-2d^2/(w_1^2 + w_2^2)) \quad (5)$$

where $T_g$ represents a coupling efficiency, $2w_1$ and $2w_2$ each represent an MFD of the respective optical fibers, and d represents an amount of axial displacement.

A connector/splice loss is caused by a difference in MFD, axial displacement of the field, or the like between two types of fibers connected. Thus, as the difference in MFD is larger (in FIG. 4, as MFD deviates further away from 9.2 μm), the connector/splice loss is greater. Therefore, it is revealed that a design in which an MFD falls below 6.5 μm is very stable in bending loss, but is very unstable in view of connection/splice.

Figure 5:
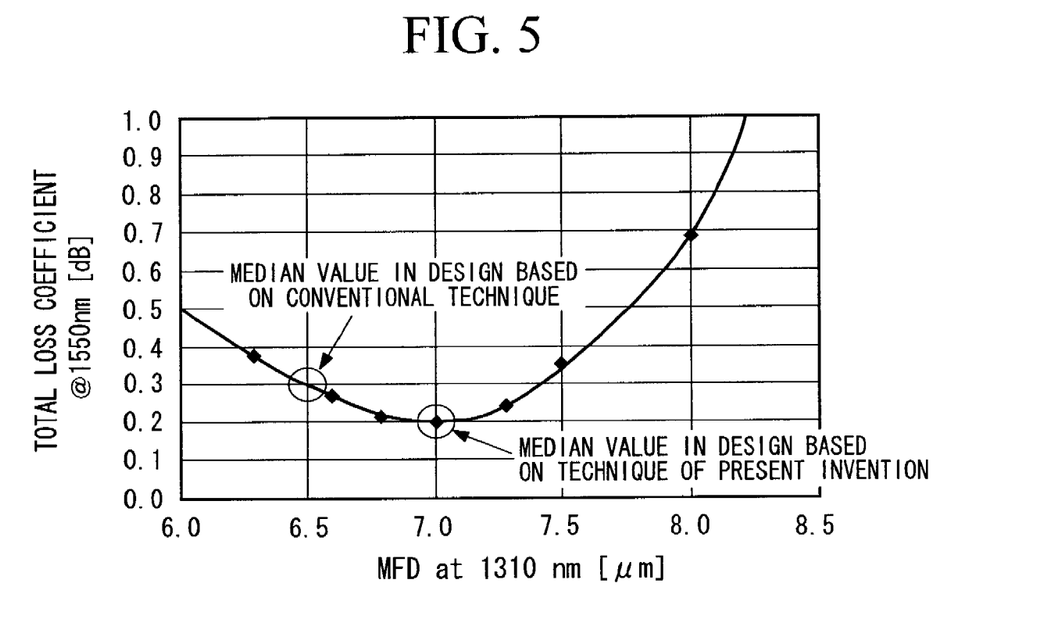
FIG. 5 is a graph of MFD dependence of a total loss coefficient, which shows a result of Example 1.

FIG. 5 shows MFD dependence of a total loss coefficient evaluated by the formula (1), a technique of the present invention. Here, $\lambda_1 = 1310$ nm, $\lambda_2 = 1550$ nm, r=10 mm, $MFD_2 = 9.2$ μm, $w_s = w_b = 0.5$. FIG. 5 reveals that the total loss coefficient L is minimum with $MFD_1 = 7.0$ μm.

Accordingly, as for the SMF of MFD=6.5 μm (Sample 2) that is supposed to be preferable in a design that takes a conventional bending loss as an indicator and the SMF of MFD=7.0 μm (Sample 1) that is evaluated as preferable by the technique of the present invention, loss variations in various circumstances were evaluated. The evaluation results are shown in Table 1. Note that in Tables 1 to 4, "evaluation condition" refers to a combination of connector/splice points and bendings.

TABLE 1

|  | Evaluation Condition No. | | | | | | | | | |
|---|---|---|---|---|---|---|---|---|---|---|
|  | 1 | 2 | 3 | 4 | 5 | 6 | 7 | 8 | Maximum Loss | Loss Variation |
|  | Connector/Splice Points | | | | | | | | | |
| Bendings | 1 0 | 1 5 | 1 10 | 1 20 | 2 0 | 2 5 | 2 10 | 2 20 | Value [dB] | Value [dB] |
| Sample 1 | 0.33 | 0.36 | 0.39 | 0.45 | 0.66 | 0.69 | 0.72 | 0.78 | 0.78 | 0.45 |
| Sample 2 | 0.53 | 0.53 | 0.53 | 0.54 | 1.06 | 1.06 | 1.06 | 1.07 | 1.07 | 0.54 |

For example, in the form in which the drop cable 14 connected with the branch cable in the closure 12 is directly connected with the ONU 15 as shown in FIG. 3A, there is the possibility that a connection with another optical fiber is added in the closure 12. Furthermore, in the connection with the ONU 15, there is the possibility that a connection with another optical fiber is added. When a wiring form as shown in FIG. 3B is assumed, a use of a cord with connectors 19 that has a connector at both of its ends can be conceived. In this case, there is the possibility that a connection with another optical fiber is added at two points at worst.

Sample 1 took $\Delta = 0.58\%$, $r_1 = 3.26$ μm, and Sample 2 took $\Delta = 0.65\%$, $r_1 = 3.07$ μm, with $\Delta$ and $r_1$ as shown in FIG. 1. In both cases, the cladding diameter was 125 μm, and the cable cut-off wavelength was 1260 nm.

The maximum value for the loss of Sample 1 produced by the technique of the present invention is suppressed to about 73% compared with that of Sample 2 by the conventional technique. Furthermore, it is revealed that the amount of variation in loss for Sample 1 is suppressed to about 83% in the assumed condition of use.

Figure 6:
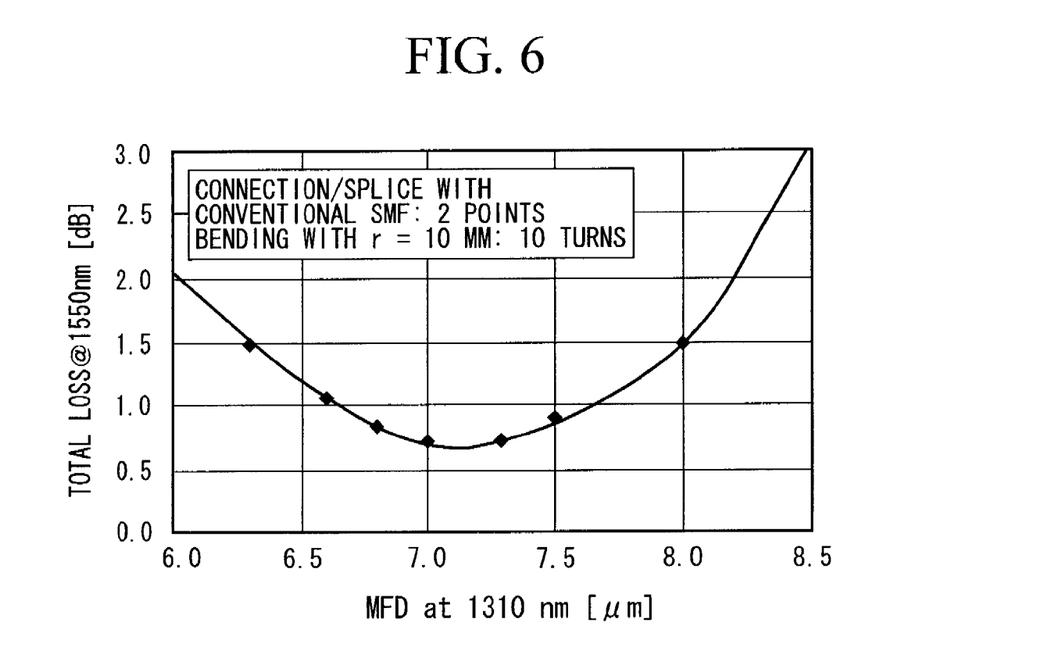
FIG. 6 is a graph of MFD dependence of a total loss coefficient, which shows a result of Example 1.

FIG. 6 shows MFD dependence of a total loss when two connector/splice points, r=10 mm, and 10 bendings are assumed. It is revealed that a substantially minimum total loss is gained near the MFD of 7.0 μm determined by the technique of the present invention.

Furthermore, when the region determined by the technique of the present invention is used, the change in total loss due to the variation in MFD can also be suppressed in a small range. For example, near MFD=7.0 μm determined by the technique of the present invention, the amount of variation in total loss is about 0.2 dB for an MFD change of about ±0.3 μm. However, when the amount of variation in total loss is intended to be suppressed to about the same degree in examples of the conventional technique, virtually no variation in MFD will be recognized. On the other hand, when about the same degree of MFD variation is allowed, the amount of variation in total loss is about 0.8 dB, which is about 4 times that of the case in which the technique of the present invention is used.

The example above shows that in the SMF designed by the technique of the present invention, overall loss by bending and connection/splice is small and that overall loss variation is very small even if variation in MFD of optical fibers, which is inevitable in manufacture, is assumed. This means that an application of the optical fiber of the present invention eliminates the need for an excessive margin in transmission line design, thus enabling an efficient design.

Example 2

This example is designed for optimal characteristics with the assumption that the refractive index profile called a single-peak type as shown in FIG. 1 is used, as is the case with the above-mentioned Example 1, to apply bendings down to a 7.5-mm radius to the SMF 100.

Figure 7:
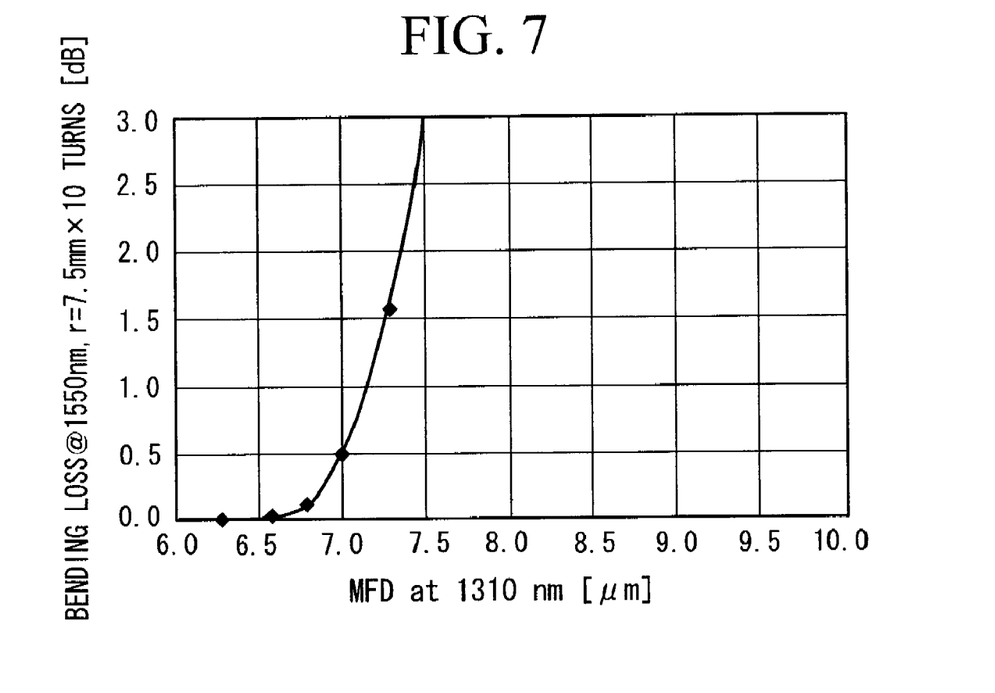
FIG. 7 is a graph of MFD dependence of bending loss (single-peak-type, r=7.5 mm), which shows a result of Example 1.

The relation, according to the single-peak-type refractive index profile, between an MFD at a wavelength of 1310 nm when a cable cut-off wavelength is set to 1260 nm and a bending loss when 10 bendings are applied with a 7.5-mm radius at a wavelength of 1550 nm (i.e., a bending loss at a wavelength of 1550 nm with 10-turn bending of a 7.5-mm radius) is shown in FIG. 7. The larger the MFD is, the smaller the bending loss is. FIG. 7 leaves an impression, as is the case with r=10 mm, that a design for making the MFD as small as possible is preferable for an SMF for use in a situation that demands resistance to bending. As is already shown in Example 1, however, there is a problem in such a region in that the connector/splice loss with a normal SMF is larger.

Figure 8:
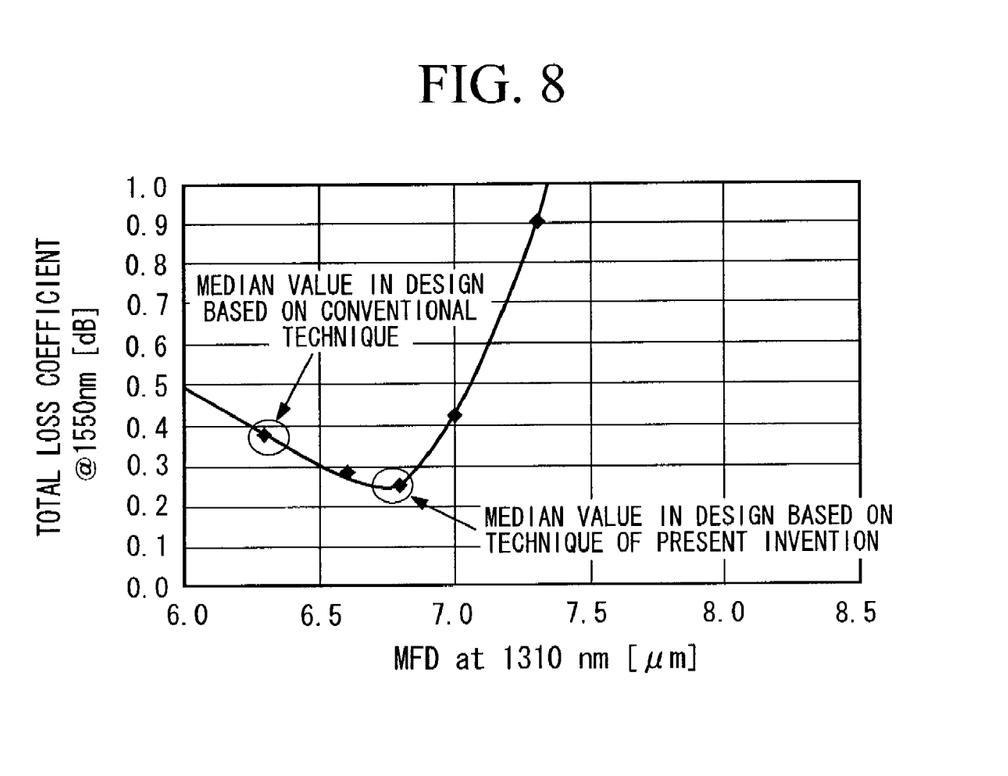
FIG. 8 is a graph of MFD dependence of a total loss coefficient, which shows a result of Example 2.

FIG. 8 shows MFD dependence of a total loss coefficient evaluated by the formula (1), a technique of the present invention. Here, $\lambda_1$=1310 nm, $\lambda_2$=1550 nm, bending radius r=7.5 mm, $MFD_2$=9.2 μm, $w_s$=$w_b$=0.5. FIG. 8 reveals that the total loss coefficient L is minimum with $MFD_1$=6.8 μm.

Accordingly, as for the SMF of MFD=6.3 μm (Sample 4) that is supposed to be preferable in a design that takes a conventional bending loss as an indicator and the SMF of MFD=6.8 μm (Sample 3) that is evaluated as preferable by the technique of the present invention, loss variations in various circumstances were evaluated. The evaluation results are shown in Table 2.

TABLE 2

|  | Evaluation Condition No. | | | | | | | | Maximum Loss | Loss Variation |
| --- | --- | --- | --- | --- | --- | --- | --- | --- | --- | --- |
|  | 1 | 2 | 3 | 4 | 5 | 6 | 7 | 8 | | |
|  | Connector/Splice Points | | | | | | | | | |
| Bendings | 1 0 | 1 5 | 1 10 | 1 20 | 2 0 | 2 5 | 2 10 | 2 20 | Value [dB] | Value [dB] |
| Sample 3 | 0.40 | 0.45 | 0.50 | 0.60 | 0.80 | 0.85 | 0.90 | 1.00 | 1.00 | 0.60 |
| Sample 4 | 0.75 | 0.75 | 0.75 | 0.75 | 1.50 | 1.50 | 1.50 | 1.50 | 1.50 | 0.75 |

Sample 3 took Δ=0.61%, $r_1$=3.17 μm, and Sample 4 took Δ=0.71%, $r_1$=2.92 μm, with Δ and $r_1$ as shown in FIG. 1. In both cases, the cladding diameter was 125 μm, and the cable cut-off wavelength was 1260 nm.

The maximum value for the loss of Sample 3 produced by the technique of the present invention is suppressed to about 66% compared with that of Sample 4 by the conventional technique. Furthermore, it is revealed that the amount of variation in loss for Sample 3 is suppressed to about 80% in the assumed condition of use.

Figure 9:
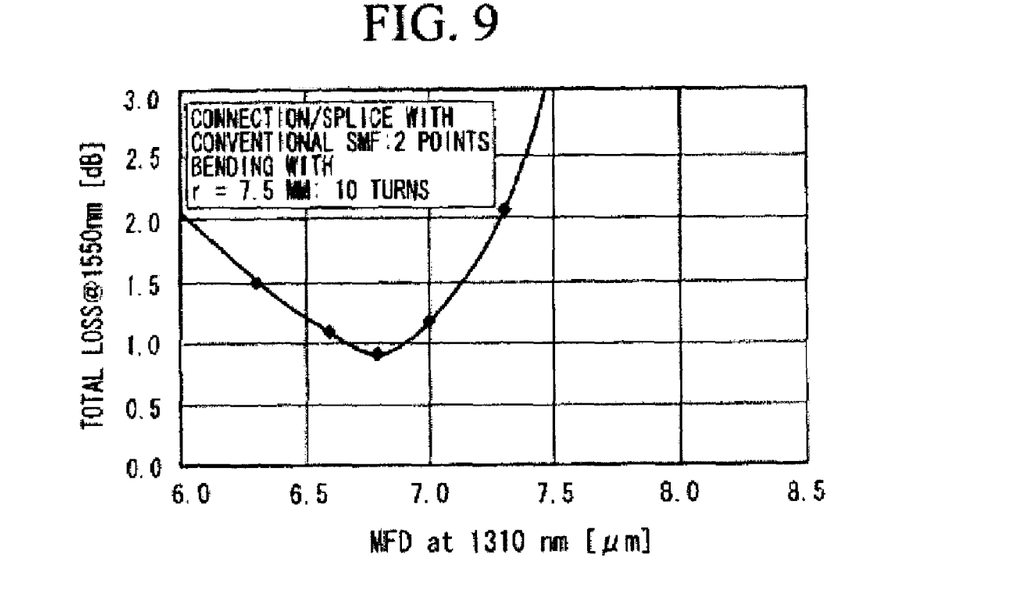
FIG. 9 is another graph of MFD dependence of a total loss coefficient, which shows a result of Example 2.

FIG. 9 shows MFD dependence of a total loss when two connector/splice points, r=7.5 mm, and 10 bendings are assumed. It is revealed that a substantially minimum total loss is gained near the MFD of 6.8 μm determined by the technique of the present invention.

Furthermore, when the region determined by the technique of the present invention is used, the change in total loss due to the variation in MFD can also be suppressed in a small range. For example, near MFD=6.8 μm determined by the technique of the present invention, the amount of variation in total loss can be suppressed to about 0.2 dB if the MFD is controlled in the range of 6.60 to 6.95 μm. However, when the amount of variation in total loss is intended to be suppressed to about the same degree in examples of the conventional technique, virtually no variation in MFD will be recognized. On the other hand, when about the same degree of MFD variation is allowed, the amount of variation in total loss is about 0.8 dB, which is about twice that of the case in which the technique of the present invention is used.

The example above shows that in the SMF designed by the technique of the present invention, overall loss by bending and connection/splice is small and that overall loss variation is very small even if variation in MFD of optical fibers, which is inevitable in manufacture, is assumed. This means that an application of the optical fiber of the present invention eliminates the need for an excessive margin in transmission line design, thus enabling an efficient design.

Example 3

This example is designed for optimal characteristics with the assumption that the refractive index profile as shown in FIG. 10 is used to apply bendings down to a 10-mm radius to the SMF 200.

Figure 11:
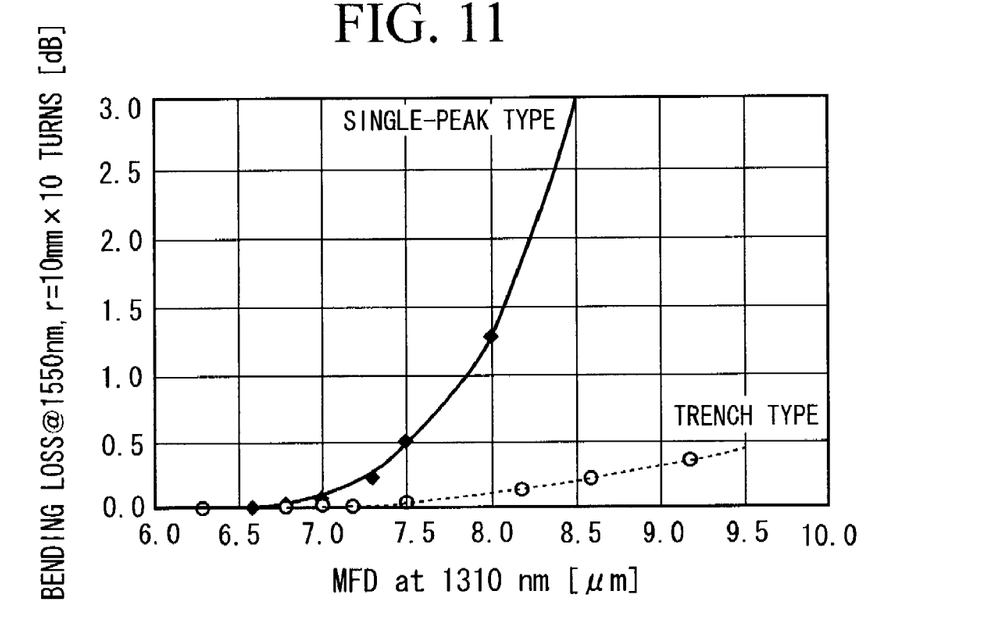
FIG. 11 is a graph of MFD dependence of bending loss (r=10 mm), which shows a result of Example 3.

The relationship, according to the refractive index profiles shown in FIG. 1 and FIG. 10, between an MFD at a wavelength of 1310 nm when a cable cut-off wavelength is set to 1260 nm and a bending loss when 10 bendings are applied with a 10-mm radius at a wavelength of 1550 nm is shown in FIG. 11. It is revealed that the refractive index profile of FIG. 10 can offer a smaller bending loss for the same MFD than the refractive index profile of FIG. 1. However, the tendency that the larger the MFD is, the smaller the bending loss is, still persists. According to the conventional design technique that focuses attention only on the bending loss, 7.0 μm is preferable for the MFD.

Figure 12:
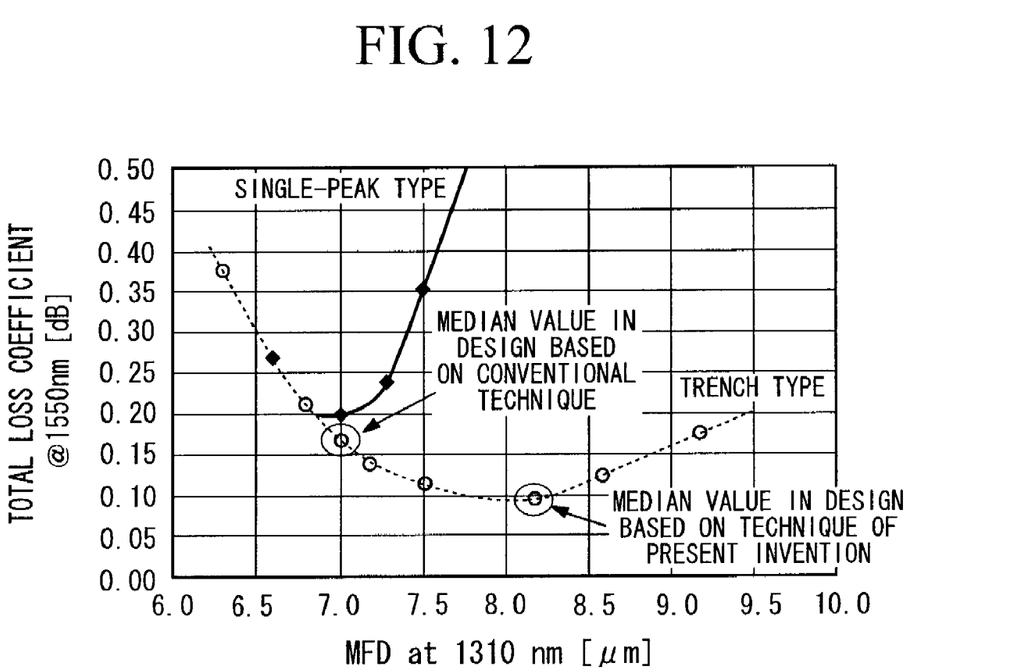
FIG. 12 is a graph of MFD dependence of a total loss coefficient, which shows a result of Example 3.

FIG. 12 shows MFD dependence of a total loss coefficient evaluated by the formula (1), a technique of the present invention. Here, $\lambda_1$=1310 nm, $\lambda_2$=1550 nm, bending radius r=10 mm, $MFD_2$=9.2 μm, $w_s$=$w_b$=0.5. FIG. 12 reveals that the total loss coefficient L is minimum with $MFD_1$=8.2 μm.

Accordingly, as for the SMF of MFD=7.0 μm (Sample 6) that is supposed to be preferable in a design that takes a conventional bending loss as an indicator and the SMF of MFD=8.2 μm (Sample 5) that is evaluated as preferable by the technique of this invention, loss variations in various circumstances were evaluated. The evaluation results are shown in Table 3, together with the evaluation results of Samples 1 and 2 with the refractive index profile of FIG. 1 shown in Example 1.

Also in this example, when the region determined by the technique of the present invention is used, the change in total loss due to the variation in MFD can also be suppressed in a small range. Even if an MFD variation of about ±0.3 μm is assumed, the change in total loss is very small, that is, 0.05 dB or less. When about the same degree of MFD variation is assumed in Sample 6 by the conventional design technique, a loss variation of about 0.5 dB is anticipated.

The example above shows that in the SMF designed by the technique of the present invention, overall loss by bending and connection/splice is small and that overall loss variation is very small even if variation in MFD of optical fibers, which is inevitable in manufacture, is assumed. This means that an application of the optical fiber of the present invention eliminates the need for an excessive margin in transmission line design, thus enabling an efficient design.

Example 4

This example is designed for optimal characteristics with the assumption that the refractive index profile as shown in FIG. 10 is used to apply bendings down to a 7.5-mm radius to the SMF 200.

TABLE 3

| | Evaluation Condition No. | | | | | | | | Maximum Loss | Loss Variation |
|---|---|---|---|---|---|---|---|---|---|---|
| | 1 | 2 | 3 | 4 | 5 | 6 | 7 | 8 | | |
| | | | | Connector/Splice Points | | | | | | |
| Bendings | 1 0 | 1 5 | 1 10 | 1 20 | 2 0 | 2 5 | 2 10 | 2 20 | Value [dB] | Value [dB] |
| Sample 5 | 0.07 | 0.13 | 0.18 | 0.30 | 0.14 | 0.20 | 0.25 | 0.37 | 0.37 | 0.30 |
| Sample 6 | 0.33 | 0.33 | 0.34 | 0.34 | 0.66 | 0.66 | 0.67 | 0.67 | 0.67 | 0.34 |
| Sample 1 | 0.33 | 0.36 | 0.39 | 0.45 | 0.66 | 0.69 | 0.72 | 0.78 | 0.78 | 0.45 |
| Sample 2 | 0.53 | 0.53 | 0.53 | 0.54 | 1.06 | 1.06 | 1.06 | 1.07 | 1.07 | 0.54 |

Sample 5 took $\Delta_1$=0.40%, $\Delta_2$=0.0%, $\Delta_3$=−0.25%, $r_1$=3.56 μm, $r_2$=11.75 μm, $r_3$=17.80 μm, and Sample 6 took $\Delta_1$=0.54%, $\Delta_2$=0.0%, $\Delta_3$=−0.25%, $r_1$=3.03 μm, $r_2$=10.00 μm, $r_3$=15.15 μm, with $\Delta_1$, $\Delta_2$, $\Delta_3$, $r_1$, $r_2$, and $r_3$ as shown in FIG. 10. In both cases, the cladding diameter was 125 μm, and the cable cut-off wavelength was 1260 nm.

The maximum loss value and amount of loss variation of Sample 5 are shown to be lower than those of Example 1 (Sample 1) in which the technique of the present invention is applied to the single-peak-type refractive index profile. This result can be anticipated also from MFD dependence of a total loss in FIG. 12, and is an effect brought about by an improvement in refractive index profile. However, the maximum loss value of Sample 5 produced by applying the technique of the present invention to the trench-type refractive index profile is suppressed to about 55% compared with that of Sample 6 by the conventional technique. Furthermore, the amount of loss variation of Sample 5 has improved by 10% or more in the assumed condition of use. It is revealed that it has improved by about 33 to 65% compared with that by the conventional design technique (Sample 2) for the single-peak-type profile.

Figure 13:
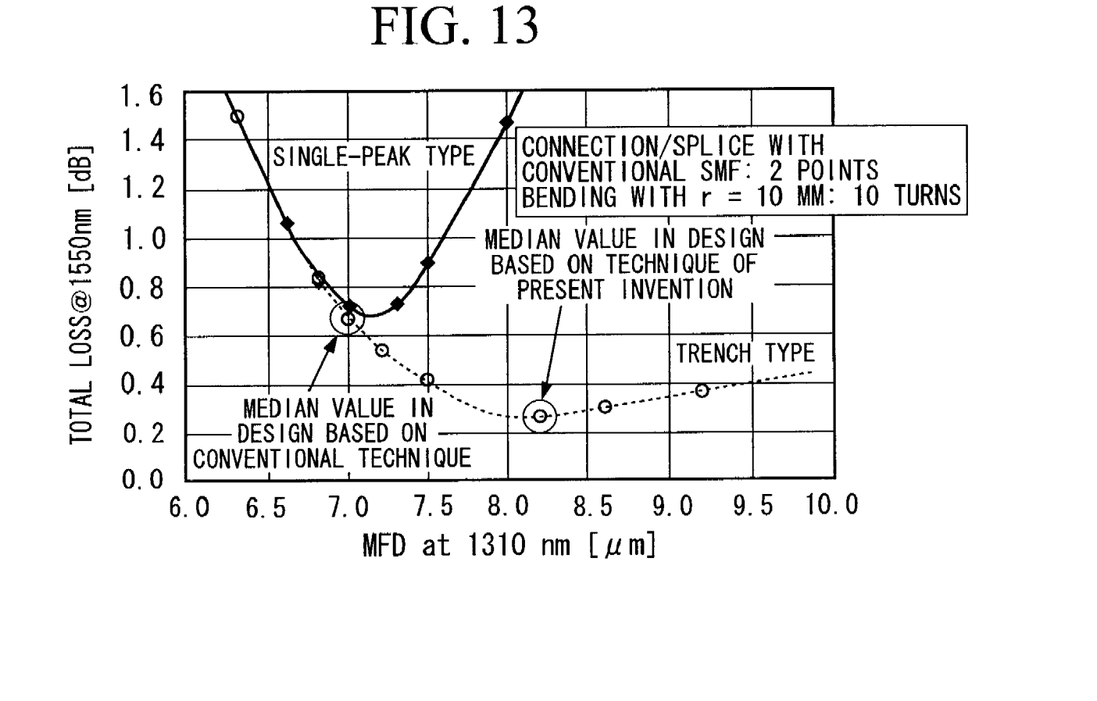
FIG. 13 is another graph of MFD dependence of a total loss coefficient, which shows a result of Example 3.

FIG. 13 shows MFD dependence of a total loss when two connector/splice points and 10 bendings are assumed. It is revealed that a substantially minimum total loss is gained near the MFD of 8.2 μm determined by the technique of the present invention.

Figure 14:
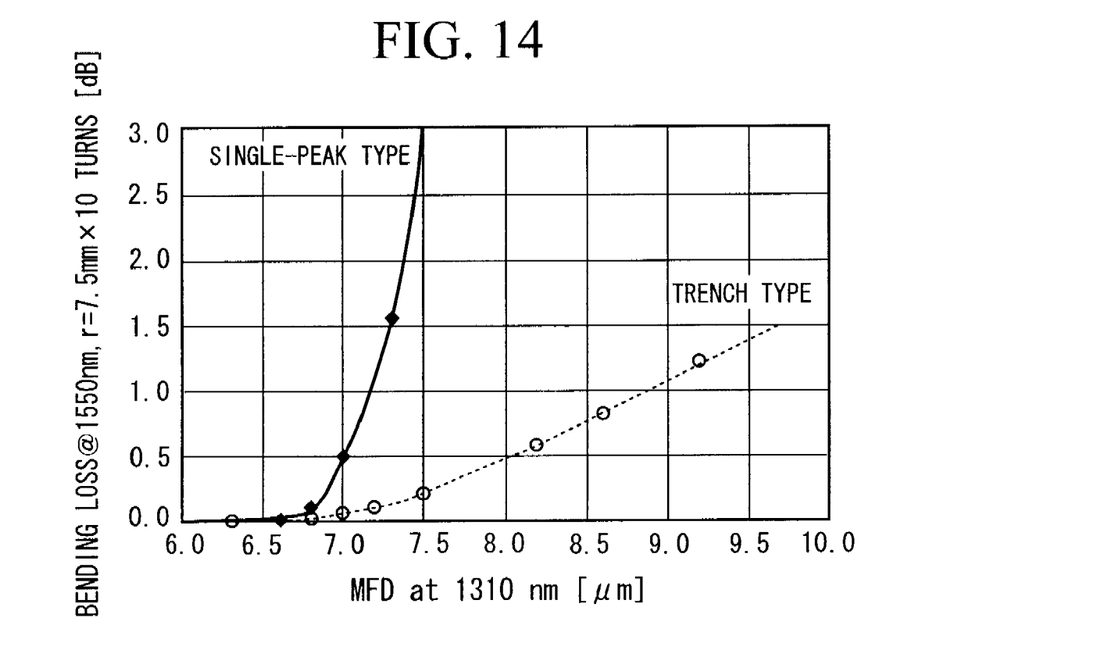
FIG. 14 is a graph of MFD dependence of bending loss (r=7.5 mm), which shows a result of Example 4.

The relationship, according to the refractive index profiles shown in FIG. 1 and FIG. 10, between an MFD at a wavelength of 1310 nm when a cable cut-off wavelength is set to 1260 nm and a bending loss when 10 bendings are applied with a 7.5-mm radius at a wavelength of 1550 nm is shown in FIG. 14. It is revealed that the refractive index profile of FIG. 10 can offer a smaller bending loss for the same MFD than the refractive index profile of FIG. 1. However, the tendency that the larger the MFD is, the smaller the bending loss is, still persists. According to the conventional design technique that focuses attention only on the bending loss, 6.8 μm is preferable for the MFD.

Figure 15:
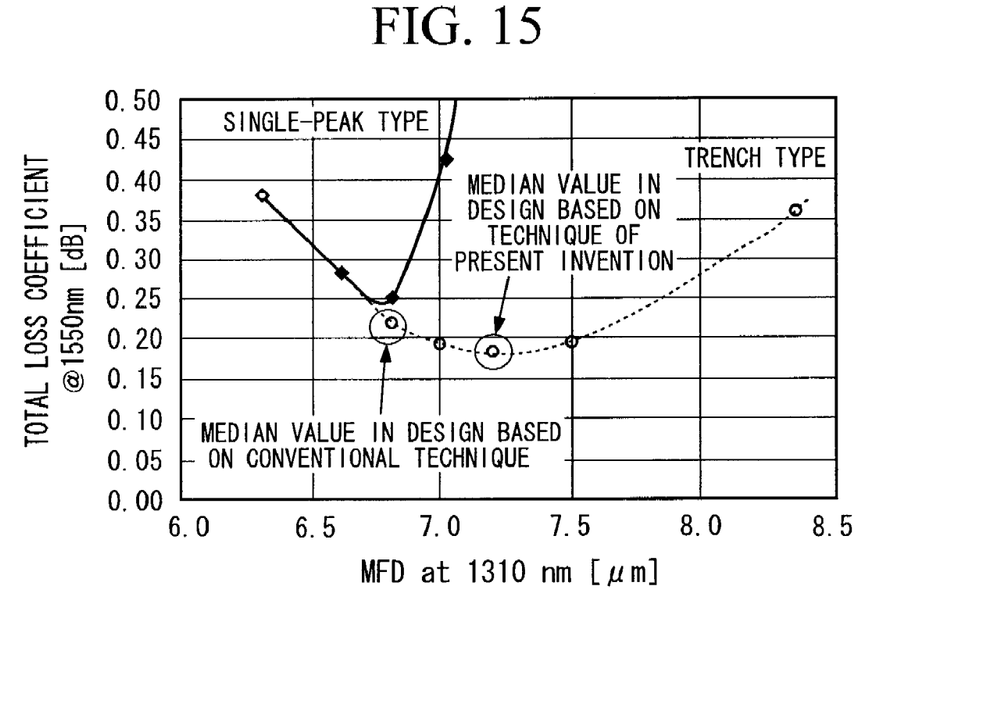
FIG. 15 is a graph of MFD dependence of a total loss coefficient, which shows a result of Example 4.

FIG. 15 shows MFD dependence of a total loss coefficient evaluated by the formula (1), a technique of the present invention. Here, $\lambda_1$=1310 nm, $\lambda_2$=1550 nm, bending radius r=7.5 mm, $MFD_2$=9.2 μm, $w_s$=$w_b$=0.5. FIG. 15 reveals that the total loss coefficient L is minimum with MFD=8.2 μm.

Accordingly, as for the SMF of MFD=6.8 μm (Sample 8) that is supposed to be preferable in a design that takes a conventional bending loss as an indicator and the SMF of MFD=7.2 μm (Sample 7) that is evaluated as preferable by the technique of this invention, loss variations in various circumstances were evaluated. The evaluation results are shown in Table 4, together with the evaluation results of Samples 3 and 4 for the refractive index profile of FIG. 1 shown in Example 2.

TABLE 4

| | Evaluation Condition No. | | | | | | | | Maximum Loss | Loss Variation |
|---|---|---|---|---|---|---|---|---|---|---|
| | 1 | 2 | 3 | 4 | 5 | 6 | 7 | 8 | | |
| | Connector/Splice Points | | | | | | | | | |
| Bendings | 1<br>0 | 1<br>5 | 1<br>10 | 1<br>20 | 2<br>0 | 2<br>5 | 2<br>10 | 2<br>20 | Value<br>[dB] | Value<br>[dB] |
| Sample 7 | 0.26 | 0.31 | 0.36 | 0.46 | 0.52 | 0.57 | 0.62 | 0.72 | 0.72 | 0.46 |
| Sample 8 | 0.42 | 0.43 | 0.44 | 0.45 | 0.84 | 0.85 | 0.86 | 0.88 | 0.88 | 0.46 |
| Sample 3 | 0.40 | 0.45 | 0.50 | 0.60 | 0.80 | 0.85 | 0.90 | 1.00 | 1.00 | 0.60 |
| Sample 4 | 0.75 | 0.75 | 0.75 | 0.75 | 1.50 | 1.50 | 1.50 | 1.50 | 1.50 | 0.75 |

Sample 7 took $\Delta_1=0.52\%$, $\Delta_2=0.0\%$, $\Delta_3=-0.25\%$, $r_1=3.10$ µm, $r_2=10.23$ µm, $r_3=15.50$ µm, and Sample 8 took $\Delta_1=0.57\%$, $\Delta_2=0.0\%$, $\Delta_3=-0.25\%$, $r_1=2.94$ µm, $r_2=9.70$ µm, $r_3=14.70$ µm, with $\Delta_1$, $\Delta_2$, $\Delta_3$, $r_1$, $r_2$, and $r_3$ as shown in FIG. 10. In both cases, the cladding diameter was 125 µm, and the cable cut-off wavelength was 1260 nm.

The maximum loss value and the amount of the loss variation of Sample 7 are shown to be lower than those of Example 2 (Sample 3) in which the technique of the present invention is applied to the single-peak-type refractive index profile. This result is an effect brought about by an improvement in refractive index profile. As for Sample 7 produced by applying the technique of the present invention to the trench-type refractive index profile shown in FIG. 10, the amount of the loss variation in the assumed condition of use is the same as that of Sample 8 by the conventional technique, but the maximum loss value is suppressed to about 82% compared with that of Sample 8. It is revealed that the maximum loss value and the amount of the loss variation are suppressed to about half compared with those by the conventional design technique (Sample 4) for the single-peak-type profile of FIG. 1.

Figure 16:
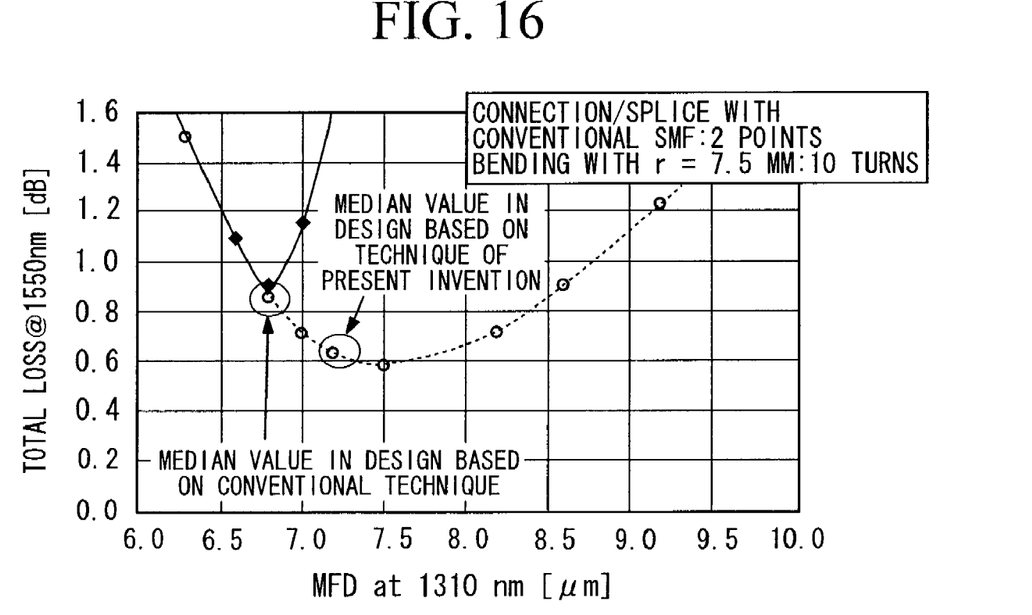
FIG. 16 is a graph of MFD dependence of a total loss coefficient, which shows a result of Example 4.

FIG. 16 shows MFD dependence of a total loss when two connector/splice points, r=7.5 mm, and 10 bendings are assumed. It is revealed that a substantially minimum total loss is gained near the MFD of 7.2 µm determined by the technique of the present invention.

Also in this example, when the region determined by the technique of the present invention is used, the change in total loss due to the variation in MFD) can also be suppressed in a small range. Even if an MFD variation of about ±0.2 µm is assumed, the change in the total loss is about 0.13 dB. To suppress the loss variation within about the same degree in the conventional design region, only about ±0.05 µm is allowed for the change in MFD. When an MFD variation of ±0.2 µm is assumed, a loss variation of about 0.6 dB is anticipated.

The example above shows that in the SMF designed by the technique of the present invention, overall loss by bending and connection/splice is small and that overall loss variation is very small even if variation in MFD of optical fibers, which is inevitable in manufacture, is assumed. This means that an application of the optical fiber of the present invention eliminates the need for an excessive margin in transmission line design, thus enabling an efficient design.

In each of the above-described examples, 1310 nm was used as the evaluation wavelength for the MFD and 1550 nm was used as the evaluation wavelength for the bending loss. However, these wavelengths also are not particularly limited by the examples. In each of the above-described examples, the MFD at a wavelength of 1310 nm was used for comparison with ITU-T G.652. On the other hand, the wavelength of 1550 nm belongs to the long wavelength side among wavelengths now generally used for optical communication.

The bending loss of the optical fiber has a tendency that the loss becomes worse as it goes further in the long wavelength side. Therefore, 1550 nm was used as the evaluation wavelength for the bending loss.

In each of the above-described examples, the calculated value from the formula (1) was used for the evaluation of the connector/splice loss. Using a measurement value of the connector/splice loss by a fusion splice, a mechanical splice, a connector connection, or the like enables the optimization of the SMF with better precision.

Furthermore, in each of the above-described examples, cladding diameter was 125 µm. However, the present invention is not limited to this. For example, to allow a bending with 5 mm or less, it is desirable that the cladding diameter be made smaller from the viewpoint of securing reliability. It is desirable that a cladding diameter of 60 to 100 µm be selected as required.

The invention claimed is:

1. A single-mode optical fiber, having a prescribed mode field diameter $MFD_1$ (µm) at a first wavelength $\lambda_1$, wherein a bending loss when measured at a second wavelength $\lambda_2$ (µm) and wound with a bending radius r (mm) is $L_b$ (dB) for one bending, the number of bendings is $t_b$, a connector/splice loss with an optical fiber that has a prescribed mode field diameter $MFD_2$ (µm) at the first wavelength $\lambda_1$ is $L_s$ (dB) for one connection/splice point at the second wavelength $\lambda_2$ (µm), the number of connector/splice points is $n_s$, and a mode field diameter dependence of a total loss coefficient L calculated by a formula (4) has a local minimal value in a range of $MFD_1 \pm 0.5$ µm, with the formula (4) being as follows:

$$L = n_s \cdot L_s + t_b \cdot L_b \quad (4)$$

where $n_s > 0$, $t_b > 0$.

2. The single-mode optical fiber according to claim 1, wherein the connector/splice loss $L_s$ is 0.5 dB or less.

3. The single-mode optical fiber according to claim 1, wherein the bending radius r is less than 15 mm.

4. The single-mode optical fiber according to claim 3, wherein the bending loss $L_b$ is 0.05 dB or less with the bending radius r=10 mm and the second wavelength $\lambda_2$=1550 nm.

5. The single-mode optical fiber according to claim 3, wherein the bending loss $L_b$ is 0.05 dB or less with the bending radius r=7.5 mm and the second wavelength $\lambda_2$=1550 nm.

6. The single-mode optical fiber according to claim 1, comprising: a central core that has a radius $r_1$ and a refractive index $n_1$; and a cladding with a substantially constant refractive index $n_c$ that surrounds the central core, where $n_1 > n_c$.

7. The single-mode optical fiber according to claim 1, including: a central core that has a radius $r_1$ and a refractive index $n_1$; an inner cladding that is provided around the outer circumference of the central core and has a radius $r_2$ and a refractive index $n_2$; a trench that is provided around the outer circumference of the inner cladding and has a radius $r_3$ and a refractive index $n_3$; and an outer cladding that is provided around the outer circumference of the trench and has a radius $r_c$ and a refractive index $n_c$, where $n_1 > n_c > n_3$, $n_1 > n_2 > n_3$.

8. The single-mode optical fiber according to claim 1, wherein the first wavelength $\lambda_1 = 1310$ nm and the mode field diameter $MFD_2$ is in a range that satisfies the specifications under the international standard ITU-T G.652.

9. The single-mode optical fiber according to claim 1, wherein the connector/splice loss is a splice loss measured with each of the optical fibers mechanically spliced.

10. The single-mode optical fiber according to claim 1, wherein the connector/splice loss is a splice loss measured with each of the optical fibers fusion-spliced.

11. The single-mode optical fiber according to claim 1, wherein the connector/splice loss is a connection loss measured with each of the optical fibers connected with a connector.

12. The single-mode optical fiber according to claim 6, wherein the diameter of the cladding is within 125 μm±1 μm.

13. The single-mode optical fiber according to claim 6, wherein the center value for the diameter of the cladding is in a range of 60 μm to 100 μm.

14. The single-mode optical fiber according to claim 7, wherein the diameter of the cladding is within 125 μm±1 μm.

15. The single-mode optical fiber according to claim 7, the center value for the diameter of the cladding is in a range of 60 μm to 100 μm.

16. A single-mode optical fiber that has a prescribed mode field diameter $MFD_1$ (μm) at a first wavelength $\lambda_1$, wherein a bending loss when measured at a second wavelength $\lambda_2$ (μm) and wound with a bending radius r (mm) is $L_b$ (dB) for one bending, the number of bendings is $t_b$, a connector/splice loss with an optical fiber that has a prescribed mode field diameter $MFD_{2i}$ (μm) at the first wavelength $\lambda_1$, is $L_{si}$ (dB) for one connection/splice point at the second wavelength $\lambda_2$ (μm), the number of connection/splice points is $n_{si}$, and a mode field diameter dependence of a total loss coefficient L calculated by a formula (B) has a local minimal value in a range of $MFD_1 \pm 0.5$ μm, the formula (B) being as follows:

$$L = \sum_{i=1}^{n} n_{si} \cdot L_{si} + t_b \cdot L_b \tag{B}$$

where n represents the number of optical fibers that are connected with the single-mode optical fiber, $n_{si}$ represents the connection times between the single-mode optical fiber and the i-th optical fiber, and $L_{si}$ represents a connector/splice loss (dB) between the single-mode optical fiber and the i-th optical fiber.

17. The single-mode optical fiber according to claim 16, wherein the connector/splice loss $L_{si}$ is 0.1 dB or less.

18. The single-mode optical fiber according to claim 16, wherein a variation in total loss coefficient L when the $MFD_1$ is changed by ±0.3 μm is 0.4 dB or less.

19. The single-mode optical fiber according to claim 18, wherein, a variation in total loss coefficient L when the $MFD_1$ is changed by ±0.3 μm is 0.2 dB or less.

* * * * *